United States Patent [19]

Saito et al.

[11] 4,235,506
[45] Nov. 25, 1980

[54] IMAGE STABILIZED OPTICAL SYSTEM

[75] Inventors: Takemi Saito, Kawagoe; Kenjiro Okamura, Omiya; Kunio Ando, Warabi, all of Japan

[73] Assignee: Fuji Photo Optical Co., Ltd., Omiya, Japan

[21] Appl. No.: 926,382

[22] Filed: Jul. 20, 1978

[30] Foreign Application Priority Data

Jul. 22, 1977 [JP] Japan .................................. 52/88145

[51] Int. Cl.³ .......................................... G02B 13/00
[52] U.S. Cl. ..................................... 350/16; 356/149
[58] Field of Search ..................... 350/16, 50, 96, 149, 350/10; 356/143, 50, 149

[56] References Cited

U.S. PATENT DOCUMENTS

| | | | |
|---|---|---|---|
| 2,829,557 | 4/1958 | Jensen | 350/16 |
| 2,939,363 | 6/1960 | Kaestuer | 350/16 |
| 3,006,197 | 10/1961 | Kenyon et al. | 350/16 |
| 3,608,995 | 9/1971 | Humphrey | 350/50 |
| 3,608,996 | 9/1971 | Humphrey | 350/16 |
| 3,610,764 | 8/1971 | Huther | 350/16 |
| 3,728,948 | 4/1973 | Fraser | 350/16 |
| 4,013,339 | 3/1977 | Andro et al. | 350/16 |

FOREIGN PATENT DOCUMENTS

1093131 11/1967 United Kingdom .................. 350/318

*Primary Examiner*—John K. Corbin
*Assistant Examiner*—B. Wm. de los Reys
*Attorney, Agent, or Firm*—Gerald J. Ferguson, Jr.; Joseph J. Baker

[57] ABSTRACT

An image stabilized optical system in which a pair of telescopic optical systems are arranged in parallel with each other to constitute binoculars. The telescopic optical system is composed of an objective, an eyepiece and an erecting prism located between the objective and the eyepiece. The erect prism is capable of having its incident light optical axis and its emanating light optical axis aligned with each other. The objectives and the eyepieces of the pair of telescopic optical systems are fixed to a casing of the image stabilized optical system, and the erect prisms are mounted on gimbals having two axes of rotation intersecting at right angle with each other. The two axes of rotation of the gimbals are included in a plane perpendicular to the main optical axes of the telescopic optical systems. The plane passes through a middle point of the distance from the objective to the eyepiece.

6 Claims, 12 Drawing Figures

IMAGE STABILIZED OPTICAL SYSTEM

BACKGROUND OF THE INVENTION

1. Field of the Invention

This invention relates to an optical system with an image stabilizing means, and more particularly to an image stabilized optical system suitable for a telescope or binoculars.

2. Description of the Prior Art

When a telescope or binoculars are supported by hands, the vibration of the hands is liable to transmit to the telescope or binoculars which results in vibration of the image viewed therethrough. Particularly when the optical instrument such as the telescope or the binoculars is carried and used in a vehicle like an aircraft or motorcar, the image is vibrated the quality of the image viewed is lowered. This is because the optical axis of the optical instrument is vibrated and the angle of the emanating optical axis is fluctuated. The vibration transmitted to the optical system is amplified by the optical system to the degree in proportion to the magnification of the optical system.

In order to avoid the vibration of the image viewed through the optical instrument or focused in an optical instrument, there have been proposed various kinds of image stabilized optical instruments. Some of these instruments are disclosed in U.S. Pat. Nos. 3,473,861, 3,608,995, and 3,608,997, and Japanese Patent Publication No. 52(1977)-23262 (U.S. Patent Appln. Ser. No. 300,528 now abandoned). These known optical systems in which the image is stabilized are very complicated in their structure. Further, most of them are of monocular type. The monocular type optical instrument is disadvantageous in that it is unstable when handled and it is not possible to see a stereoscopic view therethrough. Further, in most of these known optical instruments provided with an image stabilizing means, an optical element such as a prism or lens is mounted on a gimbal. Therefore, when the known instrument is simply applied to the binoculars having a pair of optical axes, the two optical axes cannot be always parallel to each other since they are separately stabilized by use of separate gimbals. Particularly when the optical instrument with the two optical axes which are separately stabilized is panned, it is almost impossible to make the two optical axes follow the panning to quite the same degree. Therefore, it is impossible to maintain the two optical axes always in parallel to each other, which results in deterioration in quality of the stereoscopic view observed therethrough. In addition, because of the complexity of the structure, the price and the weight of the image stabilized optical instruments is impractically very high and large.

It is also proposed to provide an optical instrument of binocular type equipped with an image stabilizing means as disclosed in U.S. Pat. Nos. 2,829,557 and 2,939,363. These optical instruments of binocular type are incomplete in principle to stabilize the image. Therefore, the image is not sufficiently stabilized, and further, the optical system and the mechanical structure thereof are both very complicated.

SUMMARY OF THE INVENTION

In view of the above described various drawbacks inherent in the conventional image stabilized optical systems or instruments, the primary object of the present invention is to provide an image stabilized optical system in which the image is effectively stabilized with a simple structure.

Another object of the present invention is to provide an image stabilized optical system which is suitable for binocular type optical instruments wherein a pair of optical axes of the binocular type optical instrument are always held in parallel to each other.

Still another object of the present invention is to provide an image stabilized optical system provided with gimbals for stabilizing a prism in which the rotor of the gimbals is driven by an electric motor.

A further object of the present invention is to provide an image stabilized optical system provided with gimbals for stabilizing a prism in which the gimbals are equipped with a lock means for locking the gimbals so that the gimbals may not be damaged by a mechanical shock when the optical system is carried or transported.

When an optical instrument such as a telescope or binoculars is held with a hand when used for instance on a moving vehicle, the vibration imparted to the optical instrument is mostly occupied by the vertical component, and the horizontal component of the vibration is very small in comparison with the vertical component. Based on this phenomenon, the above objects of the present invention are accomplished by using gimbals associated with the optical system in such a way that only the vibration in the vertical direction is completely eliminated and the vibration in the horizontal direction is allowed to remain to some extent.

The image stabilized optical system in accordance with the present invention is particularly advantageous in that only one gimbal is used for stabilizing images in binoculars and in that basically the same optical system as the conventional one can be employed. In accordance with this invention, it has been made possible to practically manufacture image stabilized binoculars. The image stabilized optical system in accordance with this invention is not only useful for the telescopes or binoculars, but also useful for an optical communicating system or a sight. For instance, a light source as of a laser is provided in one of the optical systems of the binocular system as a transmitter and a photoreceptor is provided in the other optical system thereof as a receiver to make an optical communication system stabilized for vibration. For instance, the image stabilized optical system of this invention is useful for the optical communication between unstabilized vehicles like ships. Further, by using one of the optical systems of the binocular system as a viewing system and using the other optical system as a laser beam transmitter, it is possible to provide an optical system for light beam sighting.

Here, the "image stabilized optical system" referred to in this specification is defined to be a telescopic optical system in which the optical axis of the incident light is always parallel to the initially determined optical axis of the incident light and the angle between the optical axis of the emanating light and the initially determined optical axis of the emanating light is always very small even if the optical instrument containing the image stabilized optical system is vibrated.

The image stabilized optical system in accordance with the present invention is characterized in that a pair of telescopic optical systems each comprising an objective, an eyepiece and an erect prism located therebetween which has its incident light optical axis and emanating light optical axis aligned with each other are oriented in parallel to each other, and the pair of objectives and the pair of eyepieces are fixed to a casing of the optical system so as to move together therewith, and said erect prism is mounted on gimbals provided in said casing. The gimbals are provided with a rotor and has two pairs of trunnions the axes of which are intersecting with each other at a right angle.

DESCRIPTION OF THE PREFERRED EMBODIMENTS

Figure 1:
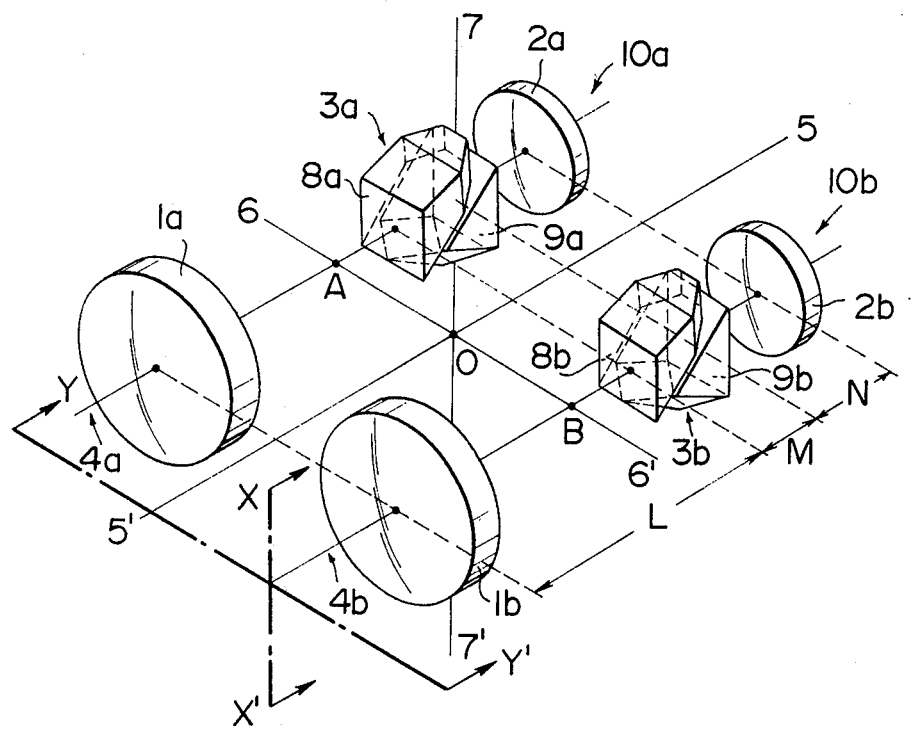
FIG. 1 is a perspective view showing the principal structure of the optical system employed in the image stabilized optical system in accordance with the present invention.

Now referring to FIG. 1, which is a perspective view showing the principal structure of the optical system employed in the image stabilized optical instrument in accordance with the present invention, reference numerals 1a, 1b indicate a pair of objectives and 2a, 2b indicate a pair of eyepieces, respectively. Between the objectives 1a, 1b and the eyepieces 2a, 2b, there are provided a pair of erect prisms 3a and 3b each of which is capable of having its incident light optical axis and emanating light optical axis aligned with each other. One objective 1a, eyepiece 2a and erect prism 3a constitute a first telescopic optical system 10a, and the other objective 1b, eyepiece 2b and erect prism 3b constitute second telescopic optical system 10b. The first and second telescopic optical systems 10a and 10b constitute an optical system of binoculars.

Figure 2:
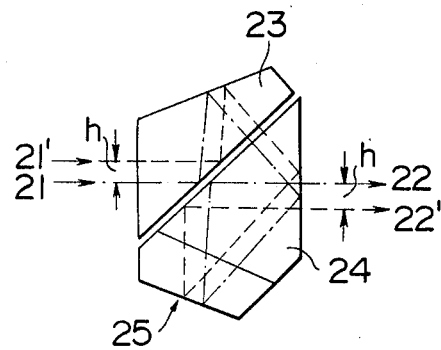
FIG. 2 is a side view showing an example of an erect prism, Schmidt prism, to be used in the optical system of the present invention.

As the erect prism which is capable of having its incident light optical axis and emanating light optical axis aligned with each other, a Schmidt's prism, an Abbe's prism or an erect prism of Bauern Fend, for example, can be used. The Schmidt's prism is shown in FIG. 2. As shown in FIG. 2, the Schmidt's prism comprises two prism blocks 23 and 24. The lower portion 25 of the prism block 24 constitutes a roof prism. In the Schmidt's prism of such structure, the optical axis of the incident light ray 21 can be aligned with the optical axis of the emanating light ray 22 as shown in FIG. 2. In such an erect prism, a light ray 21' which enters the prism in parallel to the optical axis 21 and spaced upward therefrom by a distance h will emanate from the prism in parallel to the optical axis 22 and spaced downward therefrom by the distance h as indicated at 22' in FIG. 2. In this specification, the optical system of this invention will be described with the Schmidt's prism.

Again in FIG. 1, said objectives 1a, 1b and eyepieces 2a, 2b are fixed to a casing of the optical instrument, and said erect prisms 3a and 3b are mounted on the casing rotatably within a small angular range by means of gimbals which have two pairs of trunnions. The axes of rotation of the trunnions 6—6' and 7—7' are intersecting with each other at right angle. If the gimbals are held stationary and fixed to the casing, i.e., if said two erect prisms 3a and 3b are fixed with respect to the casing, the optical system shown in FIG. 1 can be regarded as a usual optical system of binoculars. In this specification, optical axes 4a, 4b of the respective telescopic optical systems 10a and 10b with said erect prisms 3a and 3b fixed relative to the casing of the optical instrument are defined as the main optical axes of the optical system.

It should be appreciated that the main optical axes 4a and 4b are parallel to each other. The gimbals are so oriented that the axis of rotation 6—6' of one pair of trunnions intersects with the main optical axes 4a and 4b at right angle at points A and B, and that the axis of rotation 7—7' of the other pair of trunnions extends in perpendicular to the plane which includes both the main optical axes 4a and 4b and intersects with a theoretical line 5 which is parallel to and equally spaced from the main optical axes 4a and 4b. The axes of rotation 6—6' and 7—7' intersect with each other at point O.

Further, the axes of rotation 6—6' and 7—7' are positioned so that each of said points A and B at which the plane including the axes 6—6' and 7—7' intersects with the main optical axes 4a and 4b falls on the middle point of the total distance S of the sum of the optical distance L from the objective (1a, 1b) to the incident face (8a, 8b) of the erect prism (3a, 3b), the mechanical distance M from the incident face (8a, 8b) to the emanating face (9a, 9b) of the erect prism (3a, 3b), and the optical distance N from the emanating face (9a, 9b) of the erect prism (3a, 3b) to the eyepiece (2a, 2b) (S=L+M+N). Actually, the objectives and the eyepieces respectively comprise a group of lenses having a thickness. Accordingly, exactly, the points A and B should respectively fall on the middle point of the total distance of the sum of the optical distance L from the rear principal plane (nodal plane) of the objective to the incident face of the erect prism, the mechanical distance M from the incident face to the emanating face of the erect prism, and the optical distance N from the emanating face of the erect prism to the front principal plane (nodal plane) of the eyepiece.

The rear principal plane of the objective referred to in this specification is defined with respect to a focusing point for parallel light rays incident to the objective from left to right in FIG. 1. The front principal plane of the eyepiece referred to in this specification is defined with respect to a focusing point for parallel rays incident to the eyepiece from right to left in FIG. 1. As is well known in the art, the principal planes of the objective and the eyepiece will respectively coincide with the nodal planes thereof, if the objective and eyepiece are in the atmosphere of air.

The casing of the optical instrument, the gimbals and a rotor are not shown in FIG. 1 for the sake of simplicity of the drawing. These elements will be described hereinafter referring to a preferred embodiment of the present invention.

By supporting the erect prisms 3a and 3b on the gimbals so that the erect prisms 3a and 3b are rotatable within a small angular with respect to the casing of the optical system about the axes of rotation 6—6' and 7—7' and by mounting the rotor to the gimbals, the erect prisms 3a and 3b can always take their original positions even if the casing is vibrated or accidentally moved, whereby the angle of the optical axis of the emanating light of the optical system is stabilized and deterioration of the image viewed is prevented as will be described in greater detail hereinbelow.

Figure 3:
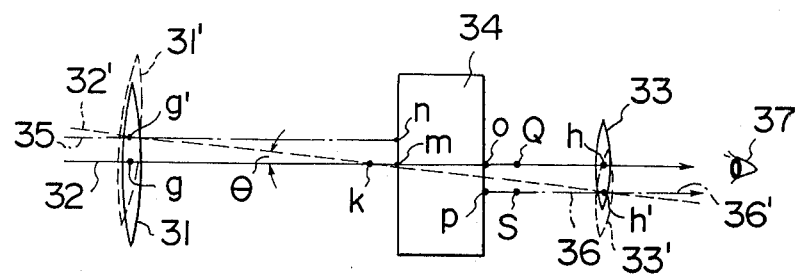
FIG. 3 is an explanatory view showing the principle in that an image is stabilized by use of an erect prism.

FIG. 3 is a diagrammatic representation corresponding to the cross section taken along line X—X' of FIG. 1 for illustrating the principle in that the optical axis is stabilized with respect to the vibration in the vertical direction or the direction of the axis 7—7' of the optical system shown in FIG. 1. Between an objective lens 31 and an eyepiece 33 is provided an erect prism 34 which has its incident light optical axis and its emanating light optical axis on a common straight line aligned with the optical axis 32 of the objective lens 31. In such an optical system, light rays incident into the objective lens 31 in parallel to the optical axis 32 emanate from the eyepiece 33 in parallel to the optical axis 32 and are viewed with an eye 37. Assuming that the optical axis 32 is tilted about a point K by an angle $\theta$ to the inclined axis 32', the point K representing the position of the axis of rotation 6—6' of the gimbals in FIG. 1 to compensate for the vertical component of the vibration, the objective lens 31 is moved to the displaced objective lens 31' and the eyepiece 33 is moved to the displaced eyepiece 33'. The principal point g of the objective lens 31 is moved to the displaced principal point g' and the principal point h of the eyepiece 33 is moved to the displaced principal point h'. However, the erect prism 34 is not moved and stays still in its original position by the effect of said gimbals on which it is mounted.

Therefore, the light ray 35 parallel to the original optical axis 32 and passing through the displaced principal point g' of the displaced objective lens 31' advances in parallel to the original optical axis 32 after passing through the displaced objective lens 31' and enters the erect prism 34 at an entrance point n apart from the entrance point m of the original optical axis 32 by a distance $\overline{mn}$. The light ray 35 which enters the erect prism 34 at the entrance point n emanates from the erect prism 34 at an exit point p downwardly apart from an exit point O of the original optical axis 32 by a distance $\overline{Op}$ which is equal to the distance $\overline{mn}$ based on the effect of the erect prism and advances in parallel to the original optical axis 32 as indicated at 36. Accordingly, the bundle parallel to the light ray 35 which enters the displaced objective lens 31' in parallel to the original optical axis 32 is focused at a point S which is on the light ray 36 emanating from the exit point p. The point S is on a focal point of the objective 31 including the focal point Q thereof. The point S is therefore also on the focal plane of the eyepiece 33. Therefore, if the light ray 36 advances in the same direction after passing through the displaced eyepiece 33' as indicated at 36', the light ray 35 parallel to the original optical axis 32 enters the eye 37 in parallel to the original optical axis 32 even if the telescopic optical system of this optical instrument is tilted. Accordingly, the angle of the emanating optical axis is not fluctuated and the image viewed is stabilized even if the telescopic optical system is vibrated. In order that the light ray 36 may advance in the same direction after passing through the displaced or tilted eyepiece 33', it is required that the light ray 36 passes through the displaced principal point h' of the displaced eyepiece 33'. For this purpose, the distance $\overline{hh'}$ from the original principal point h of the eyepiece 33 to the displaced principal point h' should be made equal to the distance $\overline{Op}$ from the exit point O of the original optical axis 32 to the exit point p of the light ray 35. Thus, the position of the point K or the position of the axis of rotation 6—6' about which the optical axis 32 is tilted is selected so that the distance $\overline{hh'}$ is made equal to the distance $\overline{Op}$. In the optical system shown in FIG. 3 in which the optical distance from the objective lens 31 to the incident face of the erect prism 34 and the optical distance from the emanating face of the erect prism 34 to the eyepiece 33 are respectively equal to their mechanical distances, the point K may simply positioned on the middle point of the mechanical distance from the objective lens 31 to the eyepiece 33 since the distance $\overline{hh'}$ is equal to the distance $\overline{gg'}$ from the original principal point g of the objective 31 to the displaced principal point g' as can be seen in FIG. 3. In the optical system shown in FIG. 3, the erect prism 34 can be located at any position of the optical path of the objective lens, since the distance $\overline{gg'}$ is always equal to the distance $\overline{Op}$.

In case that either the optical distance from the objective lens to the incident face of the erect prism or the optical distance from the emanating face of the erect prism to the eyepiece is different from its mechanical distance, the point K or the axis 6—6' of the gimbals should be positioned on the middle point of the total distance of the sum of the optical distance from the objective lens to the incident face of erect prism, the mechanical distance from the incident face the emanating face of the erect prism and the optical distance from the emanating face to the eyepiece.

Figure 4:
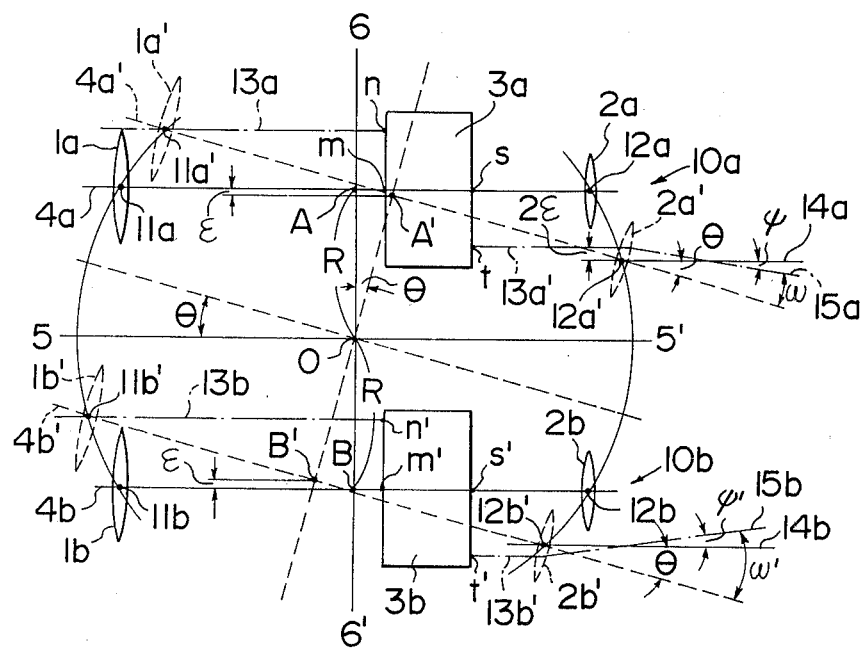
FIG. 4 is a plan view for explaining the principle in that the image is stabilized in accordance with the present invention.

FIG. 4 is a plan view for explaining the principle in that the image is stabilized with respect to the vibration in the horizontal direction or the direction of the axis 6—6' of the optical system shown in FIG. 1. In FIG. 4, objective lenses, erect prisms and eyepieces which constitute a pair of telescopic optical systems are indicated at the same reference numerals as those used in FIG. 1.

In FIG. 4, when the optical system is inclined in the horizontal direction about said point O or the axis 7—7' of the gimbals in a horizontal plane by an angle $\theta$, the erect prisms 3a and 3b are not moved and stay still in their original position by the effect of the gimbals on which it is mounted. However, the objective lenses 1a, 1b and the eyepieces 2a, 2b are respectively moved to the positions 1a', 1b', 2a' and 2b'. The optical axis 4a' of the displaced objective lens 1a' and the displaced eyepiece 2a' is inclined at the angle $\theta$ with respect to the original main optical axis 4a, and the optical axis 4b' of the displaced objective lens 1b' and the displaced eyepiece 2b' is inclined at the angle $\theta$ with respect to the original main optical axis 4b. Thus, the principal points 11a, 11b of the objective lenses 1a, 1b are respectively moved to the displaced principal points 11a', 11b' and the principal points 12a, 12b of the eyepieces 2a, 2b are respectively moved to the displaced principal points 12a', 12b'. Accordingly, said points A and B at which the axis 6—6' of the gimbals intersects with the main optical axis 4a and 4b respectively are moved to the displaced intersecting points A' and B', respectively. The point A is moved downward in FIG. 4 by a distance $\epsilon$ with respect to the original main optical axis 4a, and the point B is moved upward by the distance $\epsilon$ with respect to the original main optical axis 4b. The amount of the displacement or the value of $\epsilon$ can be represented by the following formula wherein R represents the distance between the point O and the point A or B.

$$\epsilon = R(1 - \cos\theta)$$

The light ray 13a parallel to the original main optical axis 4a of the telescopic optical system 10a and passing through the displaced principal point 11a' of the displaced objective lens 1a' advances in parallel to the original main optical axis 4a after passing through the displaced objective lens 1a' and enters the erect prism 3a at an entrance point n apart from the entrance point m of the original main optical axis by a distance $\overline{mn}$. The light ray 13a emanates from the erect prism 3a at an exit point t apart from the exit point S of the original main optical axis 4a by a distance $\overline{st}$ equal to the distance $\overline{mn}$ and advances in parallel to the original main optical axis 4a as indicated at 13a'. The light ray 13a' is refracted by the displaced eyepiece 2a' and enters the eye as indicated at 15a. If the fluctuation of the angle of the emanating light is perfectly compensated when the optical system shown in FIG. 4 is tilted by an angle $\theta$, the light ray 15a should advance in parallel to the original main optical axis 4a and should pass the displaced principal point 12a' of the displaced eyepiece 2a' as indicated at 14a. An angle $\psi$ defined by the light rays 14a and 15a represents shortage of the compensation for the telescopic optical system 10a. Light rays incident into the displaced objective lens 1a' in parallel to the original main optical axis 4a of the telescopic optical system 10a are focused by the displaced objective lens 1a' on the light ray 13a'. The light ray 13a' is upwardly offset from the light ray 14a in parallel thereto by a distance of 2$\epsilon$. Accordingly, an angle $\omega$ defined by the displaced optical axis 4a' of the displaced eyepiece 2a' and the light ray 15a is represented by a formula $$\tan\omega = \tan\theta - \frac{\cos\theta}{f'e} \cdot 2\epsilon$$
$$= \tan\theta - \frac{\cos\theta}{f'e} 2R(1 - \cos\theta)$$

wherein f'e represents the focal length of the eyepiece 2a. Therefore, the shortage of the compensation $\psi$ for the telescopic optical system 10a can be defined by a formula $$\psi = \theta - \omega.$$

When $\theta$ is small, $\psi$ is substantially equal to 2$\epsilon$/f'e, namely $$\psi \approx \frac{2\epsilon}{f'e}.$$

Similarly, the light ray 13b parallel to the original main optical axis 4b of the telescopic optical system 10b and passing through the displaced principal point 11b' of the displaced objective lens 1b' advances in parallel to the original main optical axis 4b after passing through the displaced objective lens 1b' and enters the erect prism 3b at an entrance point n' apart from the entrance point m' of the original main optical axis by a distance $\overline{m'n'}$. The light ray 13b emanates from the erect prism 3b at an exit point t' apart from the exit point S' of the original main optical axis 4b by a distance $\overline{s't'}$ equal to the distance $\overline{m'n'}$ and advances in parallel to the original main optical axis 4b as indicated at 13b'. The light ray 13b' is refracted by the displaced eyepiece 2b' and enters the eye as indicated at 15b. If the fluctuation of the angle of the emanating light is perfectly compensated when the optical system shown in FIG. 4 is tilted by an angle $\theta$, the light ray 15b should advance in parallel to the original main optical axis 4b and should pass the displaced principal point 12b' of the displaced eyepiece 2b' as indicated at 14b. An angle $\psi'$ defined by the light rays 14b and 15b represents shortage of the compensation for the telescopic optical system 10b. Light rays incident into the displaced objective lens 1b' in parallel to the original main optical axis 4b of the telescopic optical system 10b is focused by the displaced objective lens 1b' on the light ray 13b'. The light ray 13b' is downwardly offset from the light ray 14b in parallel thereto by a distance of 2$\epsilon$. Accordingly, an angle $\omega'$ defined by the displaced optical axis 4b' of the displaced eyepiece 2b' and the light ray 15b is represented by a formula $$\tan\omega' = \tan\theta - \frac{\cos\theta}{f'e} \cdot 2\epsilon$$
$$= \tan\theta - \frac{\cos\theta}{f'e} 2R(1 - \cos\theta)$$

wherein f'e represents the focal length of the eyepiece 2b. Therefore, the shortage of the compensation $\omega'$ for the telescopic optical system 10b can be defined by a formula $$\psi' = \theta - \omega'.$$

When $\theta$ is small, $\psi'$ is substantially equal to 2$\epsilon$/f'e, namely $$\psi' \approx \frac{2\epsilon}{f'e}.$$

Thus, the shortage of compensation remains in both optical axes. The direction of shortage of compensation $\psi$ is opposite to that of $\psi'$.

Figure 5:
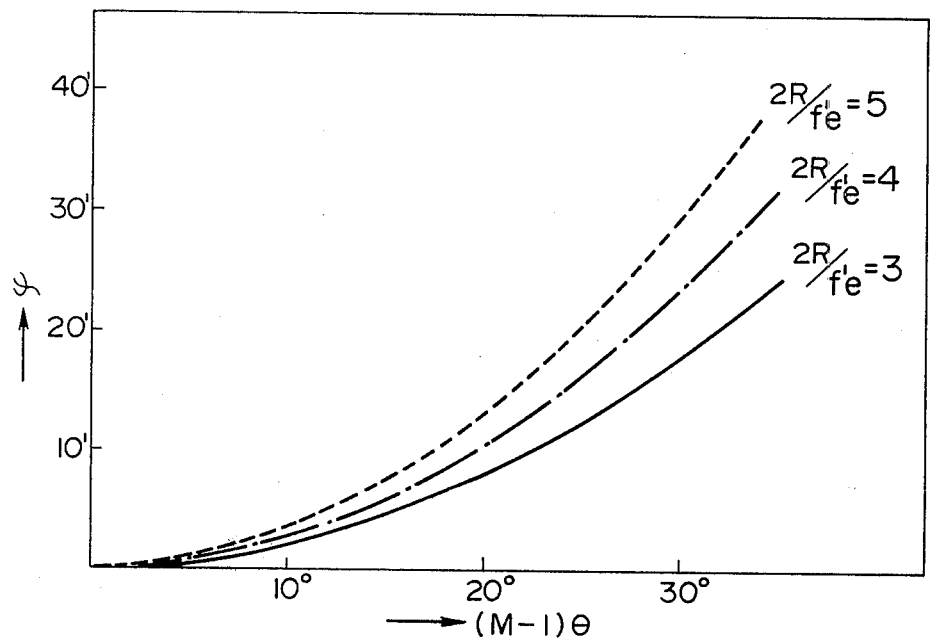
FIG. 5 is a graphical representation showing the relationship between the angle $(M-1)\theta$ of the optical axis of the light emanating from the eyepiece and the uncorrected remaining angle $\psi$ when the main optical axis of the telescopic optical system is inclined at an angle $\theta$ in the horizontal direction.

Thus, it is possible to make the shortage of the compensation $\psi$ and $\psi'$ sufficiently small by properly selecting the value of the 2R/f'e. In a usual telescopic optical system without an image stabilizing means, the emanating angle of the light ray emanating from the eyepiece when the telescopic optical system is tilted by an angle $\theta$ is defined as (M−1)$\theta$ wherein M represents the magnification of the telescopic optical system. Therefore, it is possible to know to what extent the image is stabilized by comaparing the value of $\psi$ with (M−1)$\theta$. FIG. 5 shows the relationships between $\psi$ and (M−1)$\theta$ when the value of 2R/f'e is 3, 4 and 5 with the value of M being 10x. As can be seen from FIG. 5, in the optical system of this invention, the vibration in the horizontal direction cannot be completely eliminated but the remaining vibration is negligible in practical use.

However, as can be seen from FIG. 4, in the optical system of this invention the directions of the compensated optical axes 15a and 15b is opposite to each other. This results in an error in parallelism between both telescopic optical systems 10a and 10b. If the error in parallelism exceeds a predetermined value, it becomes difficult to obtain a clear stereoscopic view of the object. Therefore, the amount of the error in parallelism will be discussed hereinbelow.

As can be seen from FIG. 4, the light rays 15a and 15b are directed inwardly. Thus the error in parallelism between the emanating angle of the telescopic optical systems corresponds to the outside error in parallelism between the optical axes of the objective lens systems and its amount is defined as $2\psi/(M-1)$.

JIS (Japanese Industrial Standard) limits the value of the error in parallelism to be not more than $K24/M-1$ degrees in case of AA Class binoculars wherein M represents the magnification and K is 1.0 with respect to the error in parallelism in the vertical direction, 1.4 with respect to the outside error, and 2.8 with respect to the inside error.

In case of A Class binoculars the error in parallelism should not be more than $K30/M-1$ (degree) in accordance with JIS.

As described above, in the optical system of this invention, the vibration in the vertical direction can be completely compensated. Therefore, there is no problem with respect to the error in parallelism in the vertical direction.

Figure 6:
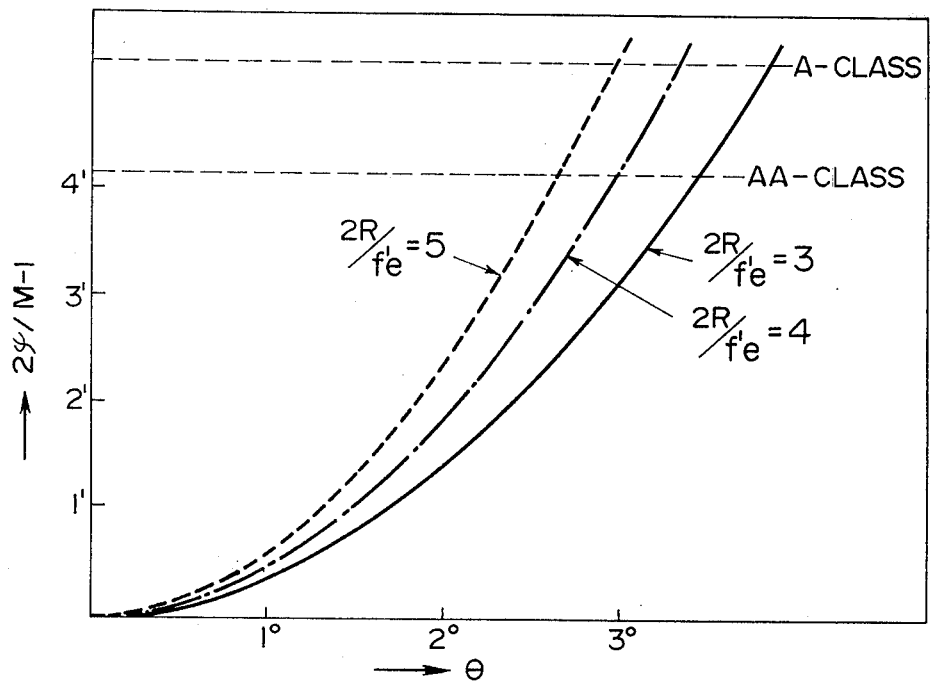
FIG. 6 is a graphical representation showing the relationship between the angle of inclination $\theta$ and the error in parallelism between the pair of optical axes of the telescopic optical systems.
Figure 7:
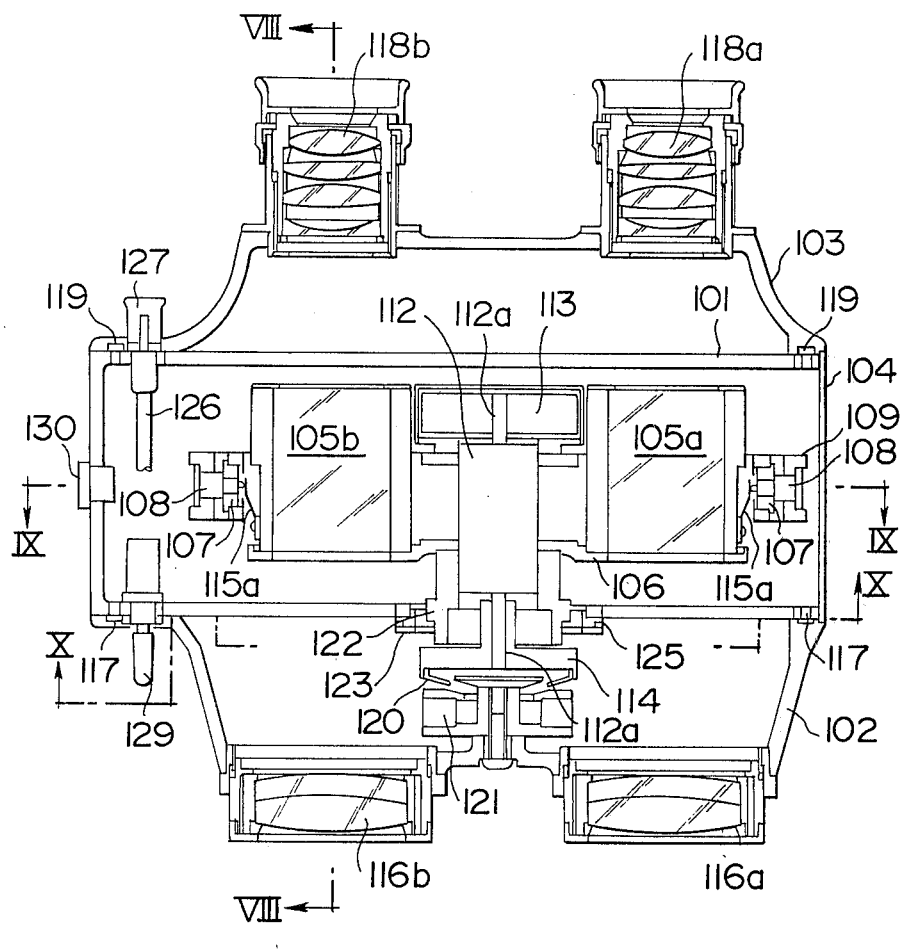
FIG. 7 is a horizontal sectional view of an embodiment of the present invention applied to binoculars.
Figure 8:
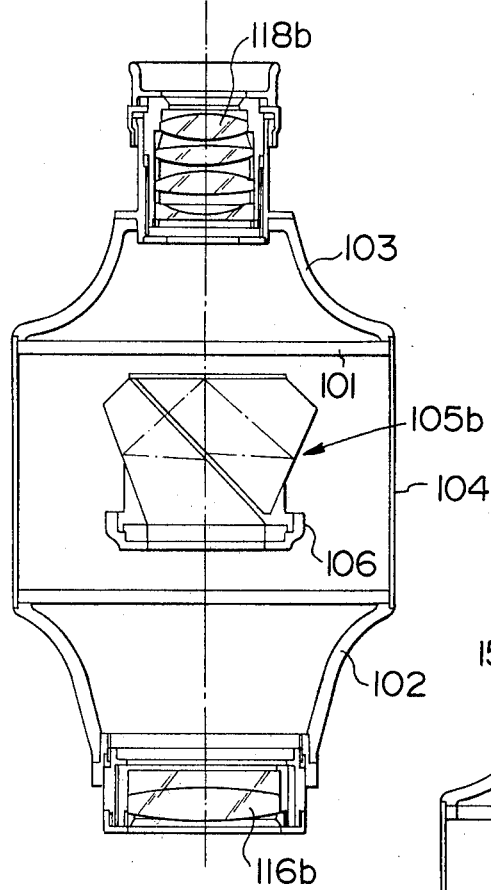
FIG. 8 is longitudinal sectional view of the binoculars taken along the line VIII—VIII of FIG. 7.

FIG. 6 shows the relationship between the angle of inclination $\theta$ and the error in parallelism with respect to the vibration in the horizontal direction when said $2R/f'e$ is 3, 4 and 5, M is 10x. As can be seen in FIG. 6 said $2\psi/(M-1)$ is able to meet the requirement of JIS by properly selecting the value of $2R/f'$. Generally, the vibration in the vertical direction shares the major portion of the vibration imparted to the optical instrument such as binoculars. Accordingly, it is obvious that in the optical system of this invention the image can be sufficiently stabilized.

In the description made hereinabove, very strict conditions for image stabilization have been discussed. However, in some use of the optical instrument, the conditions can be somewhat loosened. For instance, in FIG. 1, the one axis of rotation 6—6' which intersects at right angle with the main optical axes 4a and 4b of the pair of telescopic optical systems 10a and 10b at points A and B may not absolutely intersect with the main optical axes 4a and 4b but may be slightly separated therefrom. That is, the axis of rotation 6—6' may pass above or below the main optical axes 4a and 4b so long as the degree of compensation for vibration in the horizontal and vertical directions is within a satisfactory range. In this case, line AOB does not become a straight line but becomes a bent line bent at the point O.

Now, binoculars in accordance with an embodiment of the present invention will be described in detail referring to FIGS. 7 to 10.

The binoculars of this embodiment has a casing consisting of a casing 101 for mounting thereon gimbals on which a pair of erect prisms 105a and 105b are mounted, a casing 102 for mounting thereon a pair of objectives 116a and 116b, a casing 103 for mounting thereon a pair of eyepieces 118a and 118b and a cover member 104. The pair of erect prisms 105a and 105b are fixed to the inner ring 106 of the gimbals. The inner ring 106 is rotatably mounted on the outer ring 109 of the gimbals through a pair of bearings 107 and a pair of shafts 108. The outer ring 109 is rotatably mounted on the casing 101 through a pair of bearings 110 and a pair of shafts 111 (see FIG. 9). The inner and outer rings 106 and 109 of the gimbals are rotatable about the respective shafts 108 and 111 which extend perpendicular to each other. Accordingly, the erect prisms 105a and 105b are rotatable relative to the casing 101.

On the inner ring 106 is mounted an electric motor 112 at the intersecting point of the shafts 108 and 111 which motor has a rotor shaft 112a extending perpendicular to the shafts 108 and 111. On opposite ends of the rotor shaft 112a are mounted a pair of rotors 113 and 114.

The shafts 108 and 111 have a structure which permits flow of an electric current through its interior and the inner ends of the shafts 108 and 111 are in contact with a contact 115a and 115b, respectively, with a small pressure to provide an electric current to the motor 112 without adversely affecting the movement of the gimbals. The outer ends of the shafts 108 and 111 are connected to an external power source through a switch 129 and a connector 130 by way of a lead wire (not shown).

Said pair of objectives 116a and 116b are fixed to the casing 102 which is in turn fixed to the casing 101 at a predetermined position determined by pins 117. Said pair of eyepieces 118a and 118b are fixed to the casing 103 which is in turn fixed to the casing 101 at a predetermined position determined by pins 119.

An annular aluminum member 120 is fixed to the rotor 114. The aluminum member 120 cooperates with a permanent magnetic member 121 fixed to the casing 102 to cause precession due to the effect of eddy-current brake therebetween, thereby permitting the gimbals to move with the casing 102 when the casing 102 is panned slowly to follow the object to be viewed.

Thus, if the casing 102 is swung by a long distance, for example, to direct the objectives 116a and 116b upward, the aluminum member 120 tries to keep its position by the inertia of the rotor 114. Accordingly the magnetic member 121 is moved upward relative to the aluminum member 120. At this time, the magnetic flux of the magnetic member 121 will pass through only the upper part of the aluminum member 120 and the influence of the magnetic flux to the lower part of the aluminum member 120 is relatively weakened since the lower part is farther from the magnetic member 121 than the upper portion. As is well known, when a magnetic flux passes through a conductor in motion, an eddy-current is induced in the conductor. When the eddy-current is induced, an eddy-current brake is effected upon the moving conductor in the direction to reduce the eddy-current. Therefore, when the casing 102 is swung upward, the aluminum member 120 is moved laterally and consequently the rotor shaft 112a follows the casing 102 under the force of precession caused by the effect of the eddy-current brake.

The binoculars of this embodiment further includes a caging mechanism for holding the gimbals. The caging mechanism comprises three claws 123, ring 125 and spring 124 (see FIG. 10). The three claws 123 hold an annular member 122 provided on the exterior surface of said electric motor 112 under the force of the spring 124. Three stud pins 125a fixed to the ring 125 are engaged with recesses formed on the side surface of the claws 123. The ring 125 is rotatable and includes a projection 125b. When a button 127 (FIG. 7) projecting outside the casing of the binoculars is depressed, the projection 125b of the ring 125 is pushed by a flexible cable 126 and the ring 125 is rotated in the counterclockwise direction, whereby the claws 123 are moved to release the annular member 122 by way of engagement of the stud pins 125a and the recesses. Thus, the caging mechanism can be operated from outside the casing.

Figure 9:
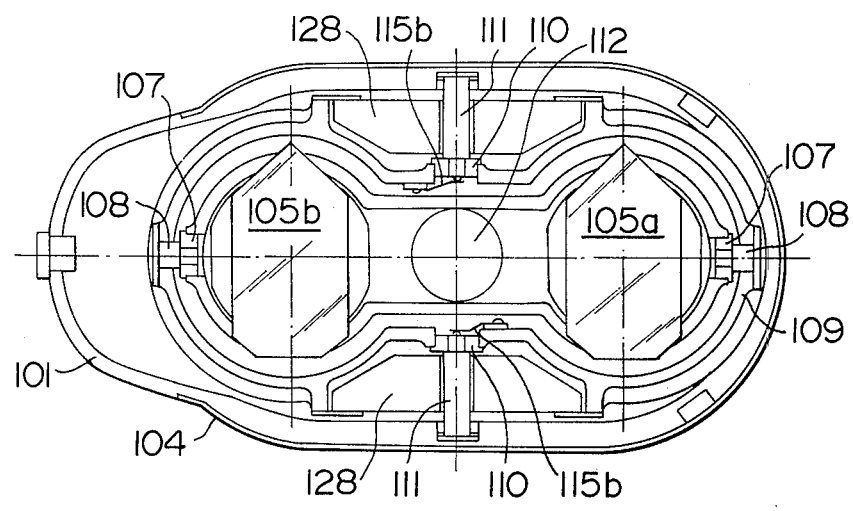
FIG. 9 is a cross sectional view of the binoculars taken along the line IX—IX of FIG. 7.
Figure 10:
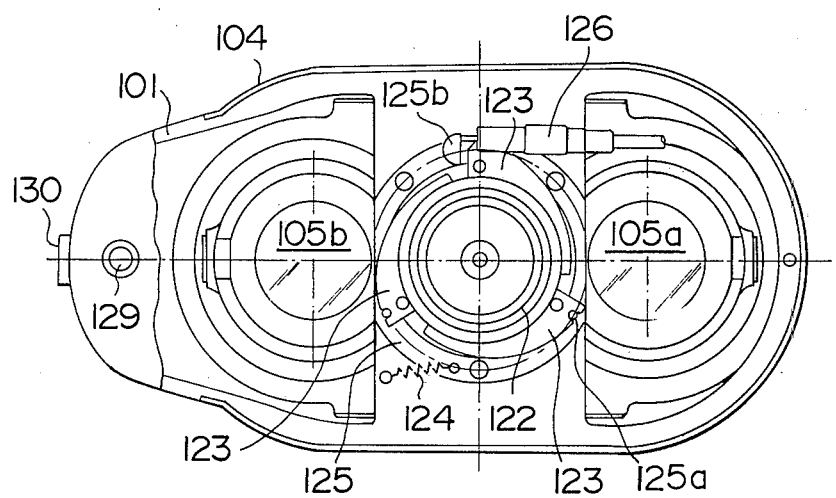
FIG. 10 is a cross sectional view of the same taken along the line X—X of FIG. 7.

Members indicated at 128 in FIG. 9 are dampers containing oil therein for absorbing impacts.

Figure 12:
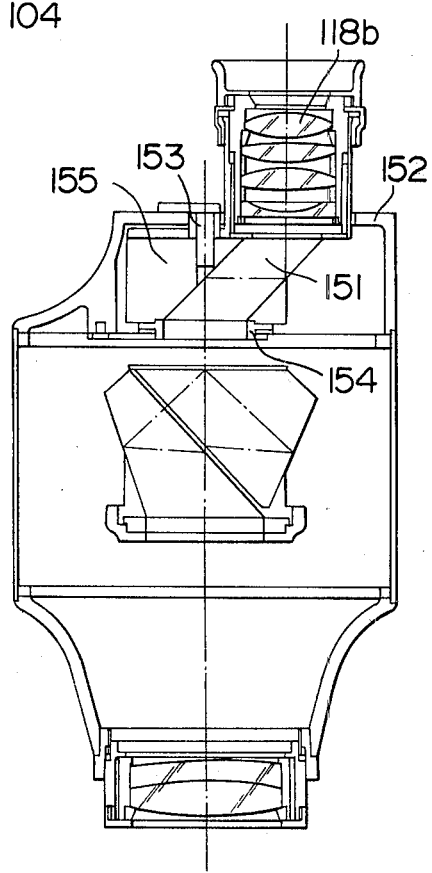
FIG. 12 is a longitudinal sectional of the binoculars taken along the line XII—XII of FIG. 11.
Figure 11:
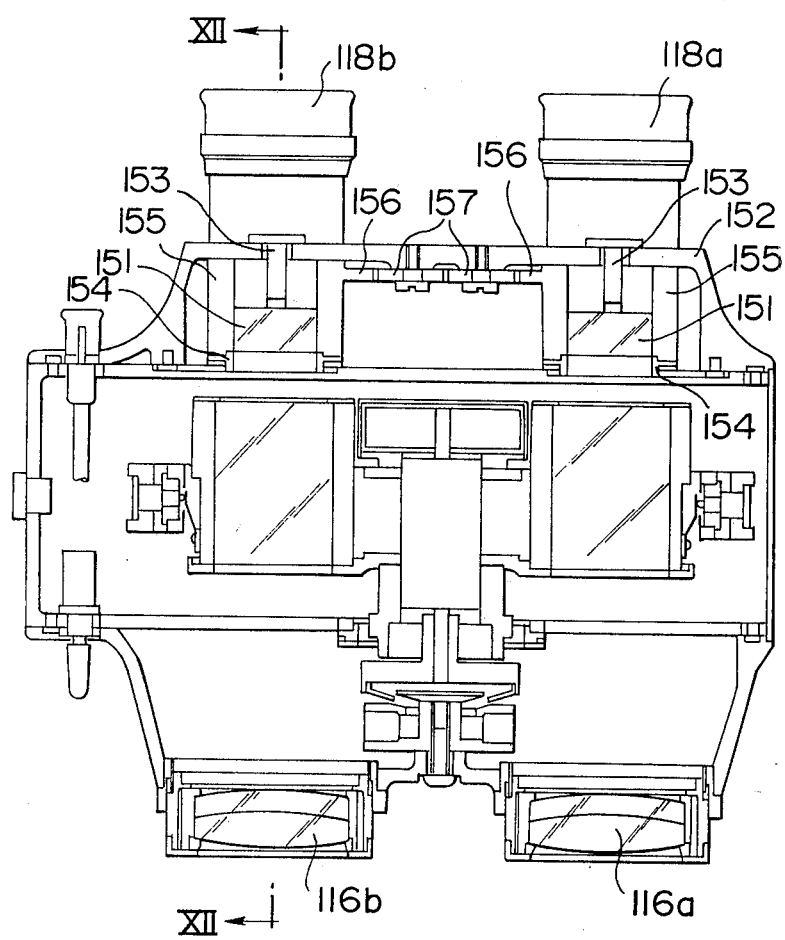
FIG. 11 is a horizontal sectional view of another embodiment of the present invention applied to binoculars.

FIGS. 11 and 12 show binoculars in accordance with another embodiment of the present invention in which the distance between the eyepieces is adjustable. In FIGS. 11 and 12, the parts similar to those used in the foregoing embodiment are indicated at the same reference numerals used in FIGS. 7 to 10.

In FIGS. 11 and 12, a pair of eyepieces 118a and 118b are respectively fixed to a pair of housings 155 together with a pair of rhombic prisms 151. The housing 155 is rotatably mounted on a casing 152 through a shaft 153 and an annular bearing 154. The pair of housings 155 are connected with each other to rotate simultaneously in opposite directions by way of a pair of sector gears 156 integrally formed therewith and a pair of intermediate gears 157 rotatably mounted to the casing 152. The axes of the shafts 153 and the bearings 154 are aligned with the optical axes of the objectives 116a and 116b of the respective telescopic optical systems. Therefore, by rotating the eyepieces 118a and 118b about the axes of the shafts 153, the distance between the optical axes of the eyepieces 118a and 118b can be changed, thereby adjusting the distance between the eyepieces to accomodate the distance between the eyes of the viewer.

We claim:

1. An image stabilized optical system in which a pair of telescopic optical systems each consisting of an objective, an eyepiece and an erect prism located therebetween, said erect prism being capable of having its incident light optical axis and its emanating optical axis aligned with each other, are arranged so that the main optical axes of said pair of telescopic optical systems are in parallel to each other characterized in that the objectives and the eyepieces of said pair of telescopic optical systems are fixed to a casing of the image stabilized optical system and the erect prisms of said pair of telescopic optical systems are rotatably mounted on the casing by means of gimbals provided with a rotor, the two axes of rotation of the gimbals intersecting at right angles with each other wherein one of said two axes of rotation of said gimbals intersects at a right angle with said main optical axes of the pair of telescopic optical systems, and the other axis of rotation passes through the middle point of the spacing between the main optical axes of said pair of telescopic optical systems and is perpendicular to the plane which includes the main optical axes of said pair of telescopic optical systems, an electric motor for driving said rotor, said motor being located at the intersection of the two axes of rotation and the axis of rotation of the rotor being parallel to the main optical axes, precessing means for moving said gimbals with the casing to permit an object to be followed as the casing is panned, said precessing means including a first member connected to said rotor.

2. An image stabilized optical system as defined in claim 1 wherein said telescopic optical system further comprises an optical path deflecting prism located between said eyepiece and said erect prism for changing the distance between the eyepieces of the pair of telescopic optical systems.

3. An image stabilized optical system as defined in claim 1 wherein a caging means is provided for preventing the erect prisms from rotating with respect to the casing of the optical system.

4. An image stabilized optical system as defined in claim 1 where said first member of the precessing means includes an annular member attached to said rotor.

5. An image stabilized optical system as defined in claims 1 or 4 wherein said precessing means includes a permanent magnet, which is magnetically coupled to said first permanent member being fixedly connected to said casing.

6. An image stabilized optical system as defined in claim 5 where said first member is made of aluminum.

* * * * *